United States Patent
Matsuhisa et al.

(10) Patent No.: US 9,033,229 B2
(45) Date of Patent: May 19, 2015

(54) SELF-CHECKOUT TERMINAL AND CONTROL METHOD THEREFOR

(71) Applicant: TOSHIBA TEC KABUSHIKI KAISHA, Shinagawa-ku, Tokyo (JP)

(72) Inventors: Kaoru Matsuhisa, Shizuoka-ken (JP); Toshiyasu Terahara, Shizuoka-ken (JP); Yuuki Kawaguchi, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 25 days.

(21) Appl. No.: 14/200,296

(22) Filed: Mar. 7, 2014

(65) Prior Publication Data

US 2014/0191037 A1    Jul. 10, 2014

Related U.S. Application Data

(62) Division of application No. 12/942,153, filed on Nov. 9, 2010, now abandoned.

(30) Foreign Application Priority Data

Dec. 22, 2009  (JP) .................................. 2009-291334

(51) Int. Cl.
| | |
|---|---|
| G06K 15/00 | (2006.01) |
| A63F 9/02 | (2006.01) |
| G06K 7/10 | (2006.01) |
| G06K 7/14 | (2006.01) |

(52) U.S. Cl.
CPC ........ *G06K 7/10821* (2013.01); *G06K 7/10861* (2013.01); *G06K 7/1404* (2013.01)

(58) Field of Classification Search
USPC .............................. 235/454, 462.01–462.45, 235/472.01–472.03; 186/35, 52, 59, 61; 705/16
See application file for complete search history.

(56) References Cited

U.S. PATENT DOCUMENTS

| | | | |
|---|---|---|---|
| 5,140,141 A | 8/1992 | Inagaki et al. | |
| 6,729,546 B2 * | 5/2004 | Roustaei | 235/462.45 |
| 7,753,269 B2 | 7/2010 | Russell et al. | |
| 8,042,740 B2 * | 10/2011 | Knowles et al. | 235/462.42 |
| 2003/0001018 A1 | 1/2003 | Hussey et al. | |

(Continued)

FOREIGN PATENT DOCUMENTS

| | | |
|---|---|---|
| JP | 5-30972 | 4/1993 |
| JP | 06-187480 | 7/1994 |
| JP | 10-097586 | 4/1998 |
| JP | 2002-078846 | 3/2002 |
| JP | 2009-211553 | 9/2009 |

OTHER PUBLICATIONS

Japanese Office Action for Japanese Application No. 2009-291334 mailed on Nov. 22, 2011.

(Continued)

*Primary Examiner* — Thien M Le
*Assistant Examiner* — April Taylor
(74) *Attorney, Agent, or Firm* — Amin, Turocy & Watson, LLP

(57) ABSTRACT

According to one embodiment, a self-checkout terminal includes a reading unit and a light emitting unit. The reading unit reads commodity information from a commodity held over a reading position. The light emitting unit emits light in a first color to illuminate the reading position and emits light in a second color in response to the reading of the commodity information by the reading unit.

3 Claims, 6 Drawing Sheets

(56) References Cited

U.S. PATENT DOCUMENTS

| | | |
|---|---|---|
| 2005/0023357 A1* | 2/2005 | Yeh .......................... 235/462.43 |
| 2005/0127185 A1 | 6/2005 | Wilz et al. |
| 2007/0158428 A1 | 7/2007 | Havens et al. |
| 2007/0170259 A1 | 7/2007 | Nunnink et al. |
| 2008/0290172 A1* | 11/2008 | Kotlarsky et al. ........ 235/462.42 |
| 2011/0121076 A1 | 5/2011 | Hennick et al. |

OTHER PUBLICATIONS

Japanese Office Action for Application No. 2009-291334 mailed on Mar. 6, 2012.

U.S. Office Action mailed on Jun. 26, 2013 corresponding to U.S. Appl. No. 12/942,153, filed Nov. 9, 2010.

U.S. Office Action mailed on Jan. 16, 2014 corresponding to U.S. Appl. No. 12/942,153, filed Nov. 9, 2010.

* cited by examiner

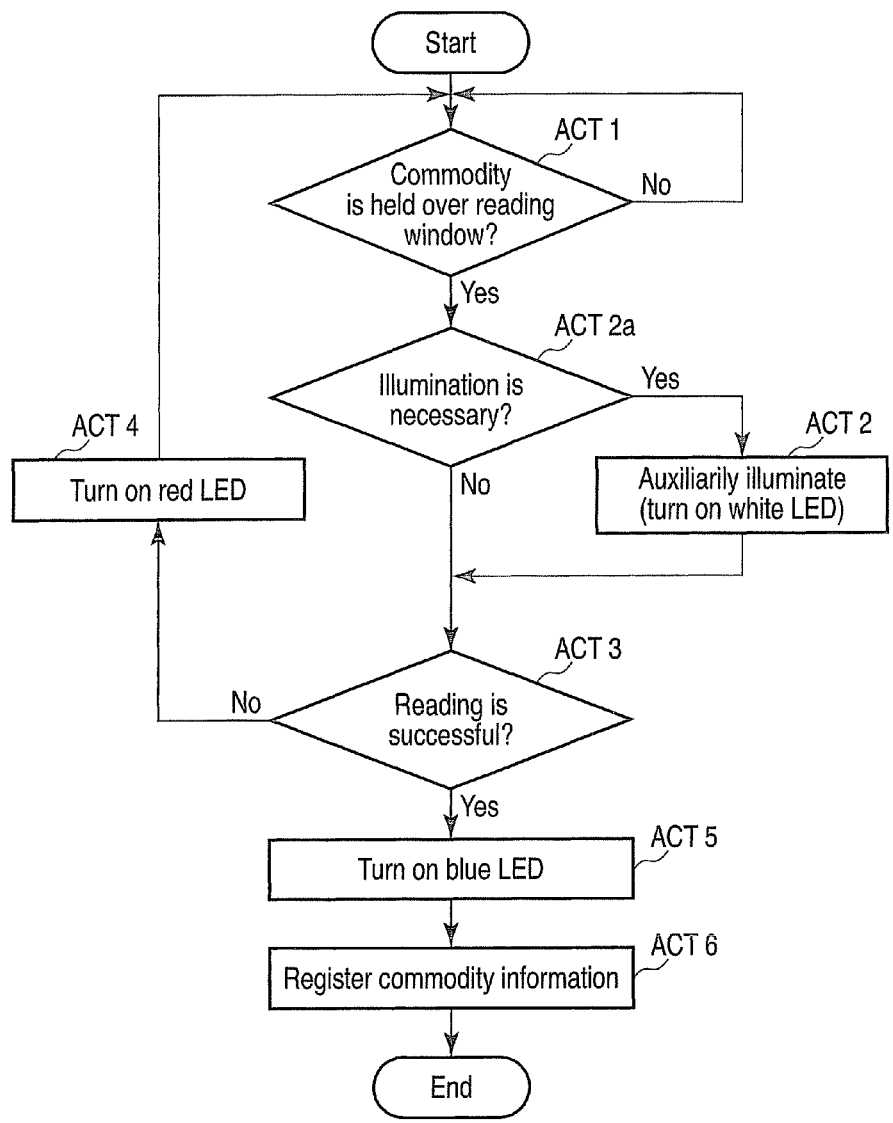
F I G. 7

SELF-CHECKOUT TERMINAL AND CONTROL METHOD THEREFOR

CROSS-REFERENCE TO RELATED APPLICATIONS

This application is a Division of application Ser. No. 12/942,153 filed Nov. 9, 2010, the entire contents of which are hereby incorporated by reference.

This application is based upon and claims the benefit of priority from the prior Japanese Patent Application No. 2009-291334, filed on Dec. 22, 2009, the entire contents of which are incorporated herein by reference.

FIELD

Embodiments described herein relate generally to a self-checkout terminal that a customer herself or himself operates to complete a series of checkout processing and a control method for the self-checkout terminal.

BACKGROUND

In general, a POS (Point Of Sales) terminal of an over-the-counter sales type, which a store clerk operates to register sales data, includes a scanner for barcode reading. The store clerk as an operator of the terminal of this type holds a barcode attached to a commodity purchased by a customer over a reading position of the scanner and inputs commodity information related to the commodity to the POS terminal.

In the past, there is known a technique for informing success or failure of reading of a barcode by sound or display such that a cashier can easily recognize whether the barcode is normally read by the scanner. As an example, there is known a hand scanner that, if reading of a barcode is abnormal, informs to that effect by emitting sound from a speaker and blinking an LED.

In recent years, in retail stores such as a supermarket and a convenience store, a checkout system of a self-checkout type is being spread. In this system, a self-checkout terminal that is a type of a POS terminal and with which a customer herself of himself can complete a series of checkout processing is used.

A customer who is about to perform checkout in the self-checkout terminal holds a barcode attached to a commodity over a reading window of a vertical scanner, which is provided on a housing surface or the like of the terminal, by herself or himself and inputs commodity information. When the customer finishes inputting commodity information for all commodities, the customer pays a price, which is calculated on the basis of the input commodity information, by cash, a card, electronic money, or the like to complete a series of checkout processing. On a display unit provided in the self-checkout terminal, in addition to the registered commodity information, guidance or the like of an operation method for customers unaccustomed to operation is displayed.

If such a checkout system of the self-checkout type is installed, since it is unnecessary to post a store clerk at each register, it is possible to substantially reduce personnel expenses.

When a customer performs checkout in the POS terminal of the self-checkout type, the customer has to hold a barcode attached to a commodity over the reading window of the scanner by herself or himself. However, in general, the customer is unaccustomed to this holding action. In some case, the customer does not know which direction with respect to the reading window the customer should hold the barcode at what position. It is also likely that light from a light source included in the scanner is blocked by a hand of the operator herself or himself during the reading action and the barcode is not sufficiently illuminated.

If, every time the customer holds a barcode over the reading window, the customer glances at input commodity information displayed on the display unit to determine success or failure of reading of the barcode, it takes long until the customer finishes inputting commodity information for all commodities.

Depending on a position where the self-checkout terminal is set, it is likely that external illumination such as in-store illumination is blocked by the terminal itself or another obstacle or the like and a sufficient amount of light necessary for reading a barcode with the scanner cannot be secured.

In this way, there are various problems concerning input of commodity information performed by using the self-checkout terminal.

BRIEF DESCRIPTION OF THE DRAWINGS

FIG. 7 is a flowchart for explaining processing executed by a CPU of the self-checkout terminal according to the third embodiment.

DETAILED DESCRIPTION

In general, according to one embodiment, a self-checkout terminal includes a reading unit and a light emitting unit. The reading unit reads commodity information from a commodity held over a reading position. The light emitting unit emits light in a first color to illuminate the reading position and emits light in a second color in response to the reading of the commodity information by the reading unit.

First, second, and third embodiments are explained below with reference to the accompanying drawings.

In the embodiments, a self-checkout terminal that a customer herself or himself operates to complete a series of checkout processing is explained as an example.

First Embodiment

Figure 1:
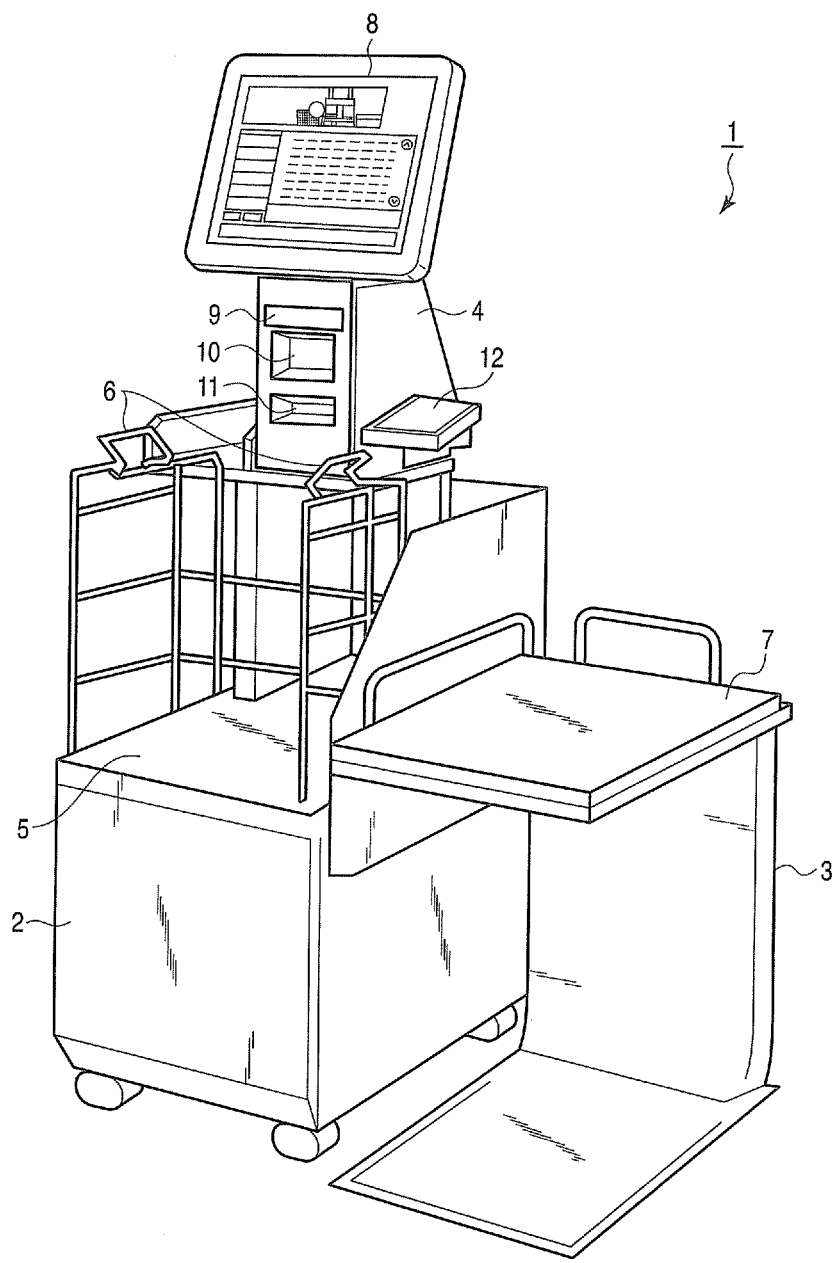
FIG. 1 is an external perspective view of a self-checkout terminal according to a first embodiment.

FIG. 1 is an external perspective view of a self-checkout terminal according to a first embodiment. This self-checkout terminal 1 includes a commodity placing table 2, a commodity placing table 3, and a main body 4 vertically provided on the commodity placing table 2.

A loading surface 5 on which commodities, for which reading of barcodes is completed, are placed and a pair of hooking sections 6 that hook gripping portions of a register bag are provided on the commodity placing table 2. A loading surface 7 on which commodities, for which reading of barcodes is not completed, are placed is provided on the commodity placing table 3.

The commodity placing table 2 includes a weight measuring unit that measures the weight of commodities placed on the loading surface 5 and commodities jammed in the register bag attached to the hooking sections 6. The commodity placing table 3 includes a weight measuring unit that measures the weight of commodities placed on the loading surface 7. The weights measured by the weight measuring units are used for weight check for preventing an omission of registration of a commodity and an illegal act.

A display unit 8, a light emitting unit 9, a reading window 10 used for reading of a barcode attached to a commodity, a receipt issue port 11 for discharging a receipt, and an electronic settlement terminal 12 that communicates with an electronic money medium by radio are provide in a housing of the main body 4.

The display unit 8 is a display with touch panel in which a touch panel is attached to the front surface of an LCD (Liquid Crystal Display).

The light emitting unit 9 is configured by combining an LED 9a that emits light in white (a first color), an LED 9b that emits light in blue (a second color), and an LED 9c that emits light in red (a third color). The light emitting unit 9 is provided between the display unit 8 and the reading window 10. Consequently, the light emitting unit 9 is located closer to a reading position for a barcode (a position right opposed to the reading window 10) than the display unit 8. Therefore, a customer who is holding a barcode over the reading window 10 while looking at near the reading position can more easily visually recognize the light emitting unit 9 than the display unit 8.

Figure 2:
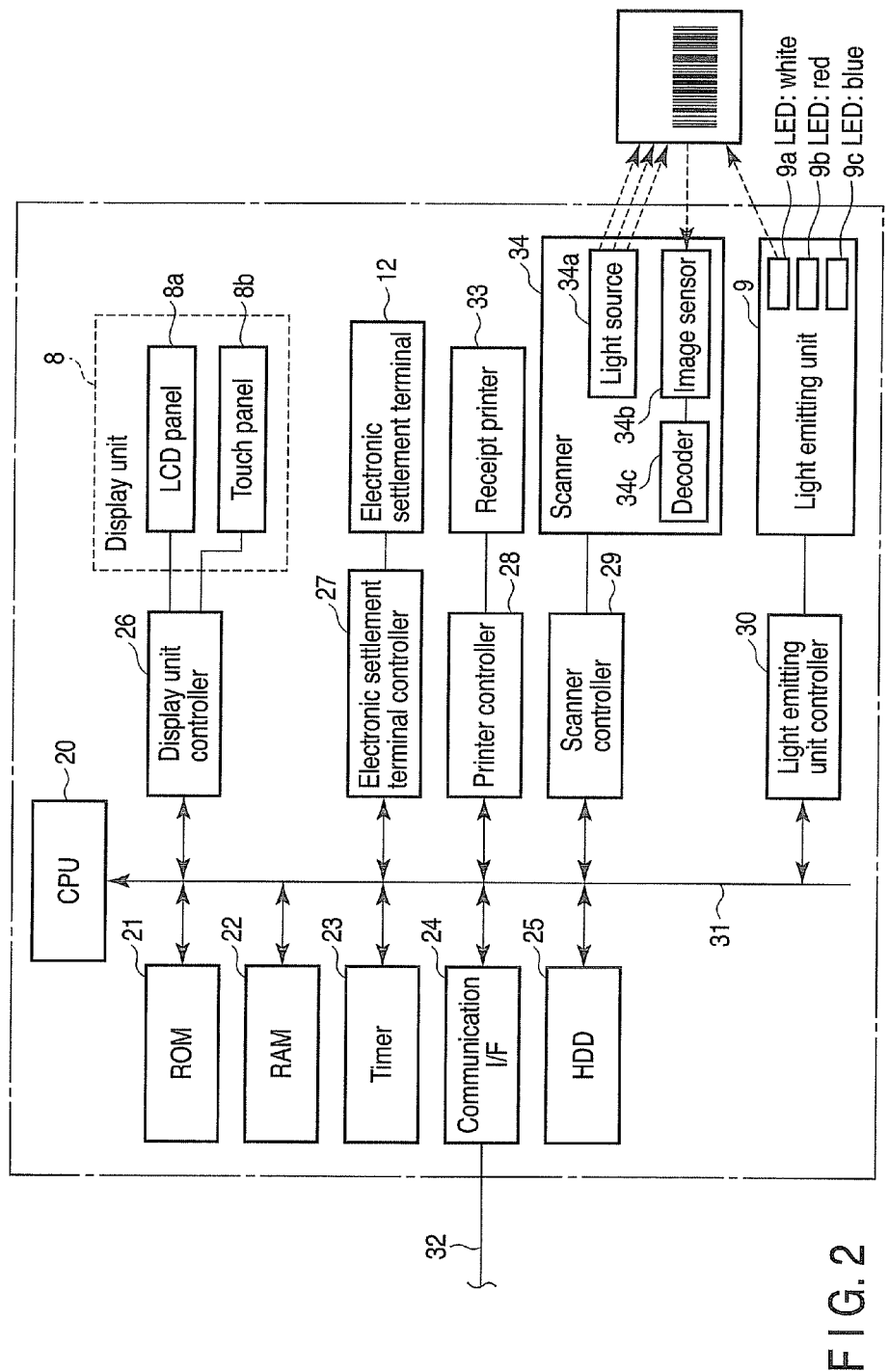
FIG. 2 is a block diagram of a control circuit of the self-checkout terminal according to the first embodiment.

FIG. 2 is a block diagram of a control circuit of the self-checkout terminal 1. In the control circuit of the self-checkout terminal 1, a ROM (Read Only Memory) 21, a RAM (Random Access Memory) 22, a timer 23, a communication I/F (Interface) 24, a HDD (Hard Disk Drive) 25, a display unit controller 26, an electronic settlement terminal controller 27, a printer controller 28, a scanner controller 29, and a light emitting unit controller 30 are connected to a CPU 20, which functions as a center of control, by a bus line 31 such as an address bus or a data bus.

A communication cable 32 connected for communication to a LAN (Local Area Network) provided in a store is connected to the communication I/F 24. An LCD panel 8a and a touch panel 8b of the display unit 8 are connected to the display unit controller 26. The electronic settlement terminal 12 is connected to the electronic settlement terminal controller 27. A receipt printer 33 is connected to the printer controller 28. A scanner 34 (a reading unit) is connected to the scanner controller 29. The light emitting unit 9 is connected to the light emitting unit controller 30.

The ROM 21 has stored therein stationary data such as a BIOS (Basic Input/Output System).

The RAM 22 forms various storage areas for work according to processing scenes. In particular, during execution of checkout processing, the RAM 22 forms a sales data registration area for registering sales data obtained by adding the number of sold items to PLU (Price Look Up) data.

The timer 23 measures system date and time used for the operation of the self-checkout terminal 1.

The HDD 25 has stored therein data necessary for the operation of the self-checkout terminal 1 such as an OS (Operating System) file, an application file, and a PLU file. In the PLU file, PLU data including commodity names and sales unit prices of commodities are registered in association with PLU codes allocated to respective commodities.

The display unit controller 26 converts display data output from the CPU 20 into a video signal and outputs the video signal to the LCD panel 8a. The display unit controller 26 calculates, on the basis of an electric signal output from the touch panel 8b, a coordinate of a touch-operated position and notifies the CPU 20 of the coordinate. The LCD panel 8a displays, for a customer who operates the self-checkout terminal 1, information based on the video signal output from the display unit controller 26. The touch panel 8b is a touch panel of a resistance film type (a resistive touch panel) configured to, for example, output a voltage drop amount corresponding to a contact position.

The electronic settlement terminal controller 27 controls communication timing between the electronic settlement terminal 12 and an electronic money medium such as an IC card or a portable communication terminal and notifies the CPU 20 of electronic money information detected from the electronic money medium by the electronic settlement terminal 12.

The receipt printer 33 is a so-called thermal printer configured to, for example, convey a receipt sheet as thermal recording paper with a conveying roller while nipping the receipt sheet with a thermal head and a platen roller. A receipt printed by the receipt printer 33 is discharged from the receipt issue port 11. The printer controller 28 drives the receipt printer 33 to form a pattern based on print data received from the CPU 20 on the receipt sheet.

The scanner 34 is a barcode scanner of a camera imaging type and includes a light source 34a for illuminating a reading position for a barcode, an image sensor 34b in which imaging devices such as CCDs (Charge Coupled Devices) are arrayed in a row, and a decoder 34c. The image sensor 34b converts reflected light from a commodity illuminated by the light source 34a into a video signal and outputs the video signal to the decoder 34c. The decoder 34c analyzes the video signal output from the image sensor 34b and generates barcode data. The scanner controller 29 controls timing for reading of a barcode by the scanner 34 and notifies the CPU 20 of the barcode data output from the scanner 34.

The light emitting unit controller 30 controls the light emitting unit 9 to turn on and turn off the LEDs 9a to 9c. The LED 9a plays a role of auxiliarily illuminating the reading position for barcode by the scanner 34 and indicating the reading position to the customer. On the other hand, the LEDs 9b and 9c play a role of informing the customer of success or failure of reading of the barcode.

Figure 3:
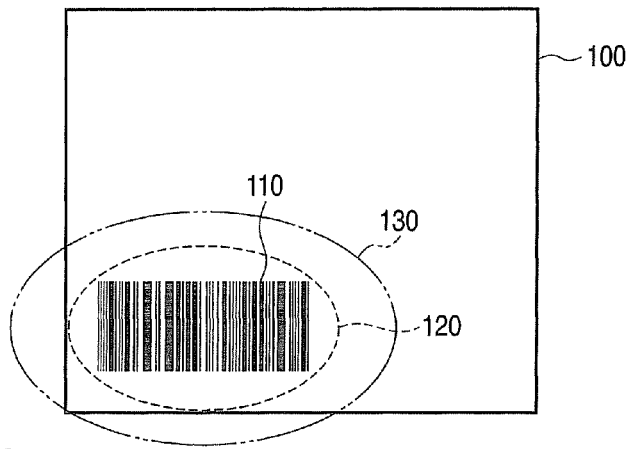
FIG. 3 is a schematic diagram of an illumination range of a light emitting unit included in the self-checkout terminal according to the first embodiment.

An illumination range by the LED 9a is explained with reference to a schematic diagram of FIG. 3.

In the figure, reference numeral 100 denotes a commodity held over the reading window 10 and 110 denotes a barcode attached to the commodity 100. An illumination range 120 by the LED 9a is set smaller than a reading range 130 for the barcode 110 by the scanner 34. The customer only has to adjust a position where the customer holds the commodity 100 over the reading window 10 such that the barcode 110 is located in the illumination range 120.

The operation of the self-checkout terminal 1 is explained below.

Checkout Processing

First, a series of flow of checkout processing performed by using the self-checkout terminal 1 is explained.

When the customer places a shopping basket including commodities before purchase on the loading surface 7 of the commodity placing table 3, the weight measuring unit incorporated in the commodity placing table 3 reacts and measures total weight of these commodities. The checkout processing is started by being triggered by the measurement of the total weight. At this point, the scanner 34 is controlled by the scanner controller 29 to start illumination by the light source 34*a* and shifts to a state for receiving reading of a barcode.

When the customer takes out a commodity from the shopping basket placed on the commodity placing table 3 and holds a barcode attached to the commodity over the reading window 10, the barcode is decoded by the decoder 34*c*. Data decoded in this way, i.e., a PLU code (commodity information) is notified to the CPU 20. The CPU 20 that receives the notification of the PLU code retrieves PLU data associated with the detected PLU code from the PLU file stored in the HDD 25 and registers sales data obtained by associating the number of sold items with the found PLU data in a storage area for sales data registration formed in the RAM 22.

While reading of the barcode is received, a closing key for declaring the completion of input of the PLU code is displayed on the display unit 8. When reading of barcodes is completed for all the commodities, the customer touch-operates the closing key. Then, a price of the commercial transaction is calculated on the basis of the sales data registered in the storage area for sales data registration and is displayed on the display unit 8. After the price is displayed, the electronic settlement terminal 12 is controlled by the electronic settlement terminal controller 27 to shift to a state for standing by for communication with an electronic money medium.

At this point, if the customer holds an electronic money medium of the customer over the electronic settlement terminal 12, electronic money information necessary for electronic settlement is read from the electronic money medium. When the electronic money information is notified from the electronic settlement terminal controller 27, the CPU 20 performs electronic money settlement according to a well-known procedure, completes one commercial transaction, and ends the checkout processing.

Light Emission Control

Light emission control for the light emitting unit 9, which is characteristic control of this embodiment, is explained below.

Figure 4:
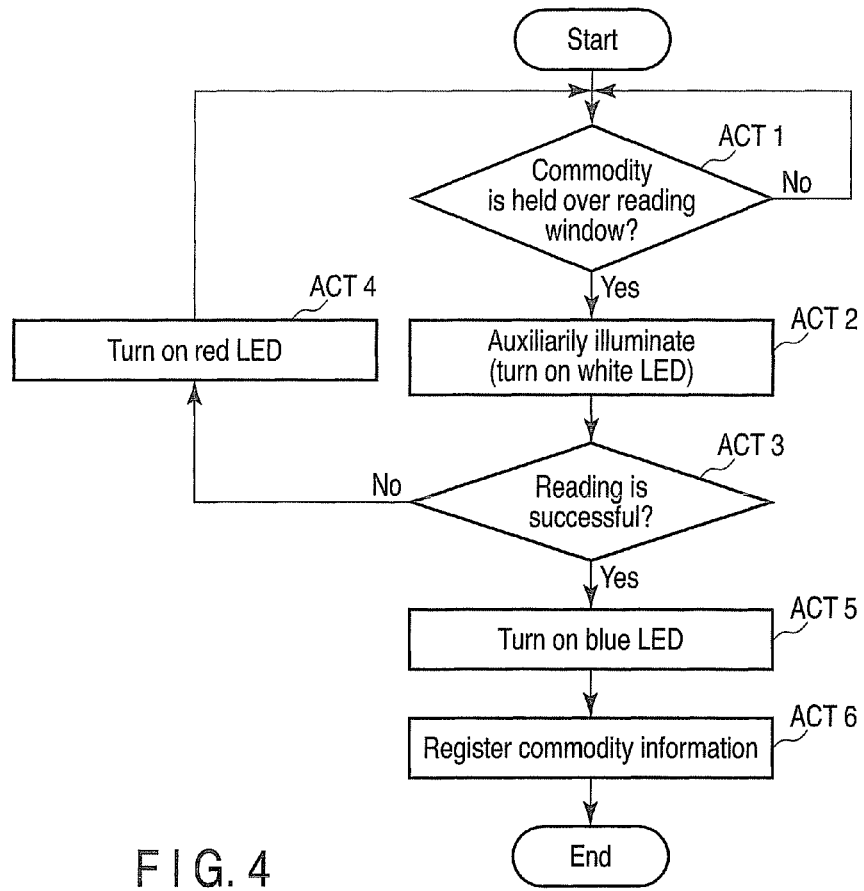
FIG. 4 is a flowchart for explaining processing executed by a CPU of the self-checkout terminal according to the first embodiment.

FIG. 4 is a flowchart for explaining processing executed by the CPU 20 in the light emission control.

While the scanner 34 receives reading of a barcode in the checkout processing, the CPU 20 determines whether a commodity is held over the reading window 10 (ACT 1). For example, if a change equal to or larger than a threshold set in advance occurs in a video signal output from the image sensor 34*b*, the CPU 20 determines that a commodity is held over the reading window 10. Alternatively, if the decoder 34*c* detects some bar pattern, the CPU 20 may determine that a commodity is held over the reading window 10.

If it is determined in the processing in ACT 1 that a commodity is held over the reading window 10 (Yes in ACT 1), the CPU 20 controls the light emitting unit 9 via the light emitting unit controller 30 to turn on the LED 9*a* (ACT 2). According to the turn-on of the LED 9*a*, as explained with reference to FIG. 3, the reading range for a barcode by the scanner 34 is auxiliarily illuminated. The customer adjusts an angle and a position for holding the commodity over the reading window 10 such that a barcode attached to the commodity is located in the illumination range of the LED 9*a*.

After turning on the LED 9*a*, the CPU 20 determines whether the scanner 34 succeeds in reading of the barcode (ACT 3). If the decoder 34*c* cannot decode the barcode, the CPU 20 determines that the scanner 34 fails in the reading of the barcode (No in ACT 3). In this case, the CPU 20 controls the light emitting unit 9 via the light emitting unit controller 30 to turn off the LED 9*a* and instantaneously turn on the LED 9*b* (ACT 4). According to the turn-on of the LED 9*b*, the light emitting unit 9 emits light in red. Therefore, the customer can recognize that the scanner 34 fails in the reading of the barcode. Thereafter, the CPU 20 returns to ACT 1 and repeats the processing in ACT 1 and subsequent acts.

On the other hand, if the decoder 34*c* can decode the barcode, the CPU 20 determines that the scanner 34 succeeds in the reading of the barcode (Yes in ACT 3). In this case, the CPU 20 controls the light emitting unit 9 via the light emitting unit controller 30 to turn off the LED 9*a* and instantaneously turn on the LED 9*c* (ACT 5). According to the turn-on of the LED 9*c*, the light emitting unit 9 emits light in blue. Therefore, the customer can recognize that the scanner 34 succeeds in the reading of the barcode.

Thereafter, the CPU 20 retrieves PLU data associated with a PLU code, which is decoded barcode data, from the PLU file stored in the HDD 25 and registers sales data obtained by associating the number of sold items with the found PLU data in the storage area for sales data registration formed in the RAM 22 (ACT 6). A series of light emission control for the light emitting unit 9 ends.

As explained above, the light emitting unit 9 included in the self-checkout terminal 1 according to this embodiment emits light in white and illuminates the reading position for a barcode by the scanner 34. Since the customer only has to hold the barcode over the position illuminated by the light emitting unit 9, the customer can easily grasp an angle and a position for holding the commodity over the reading window 10. As a result, reading work for the barcode is smoothened and the checkout processing is quickened. The illumination of the reading position by the light emitting unit 9 also plays a role of auxiliary illumination. In other words, since the barcode is illuminated with a sufficient amount of light, there is also an effect that reading accuracy for the barcode by the scanner 34 is improved.

If the reading of the barcode by the scanner 34 is successful, the light emitting unit 9 emits light in blue. If the reading is unsuccessful, the light emitting unit 9 emits light in red. Therefore, the customer can recognize success or failure of the reading of the barcode without the necessity of checking display content of the display unit 8. Further, since the light emitting unit 9 is arranged in a position closer to the reading position than the display unit 8, moving width of the line of sight of the customer for checking success or failure of the reading of the barcode is reduced to be smaller than that for checking the display content of the display unit 8. Therefore, it is possible to reduce time until the customer shifts to the next reading action.

Second Embodiment

A second embodiment is explained below with reference to FIG. 5.

This embodiment is different from the first embodiment in that success of reading of a barcode by the scanner 34 is informed by turning off the LED 9*a*. Besides, components same as those in the first embodiment are denoted by the same reference numerals and signs and redundant explanation of the components is omitted.

A control circuit of the self-checkout terminal 1 according to this embodiment is the same as that in the first embodiment. However, the LED 9*c* does not have to be provided in the light emitting unit 9.

Figure 5:
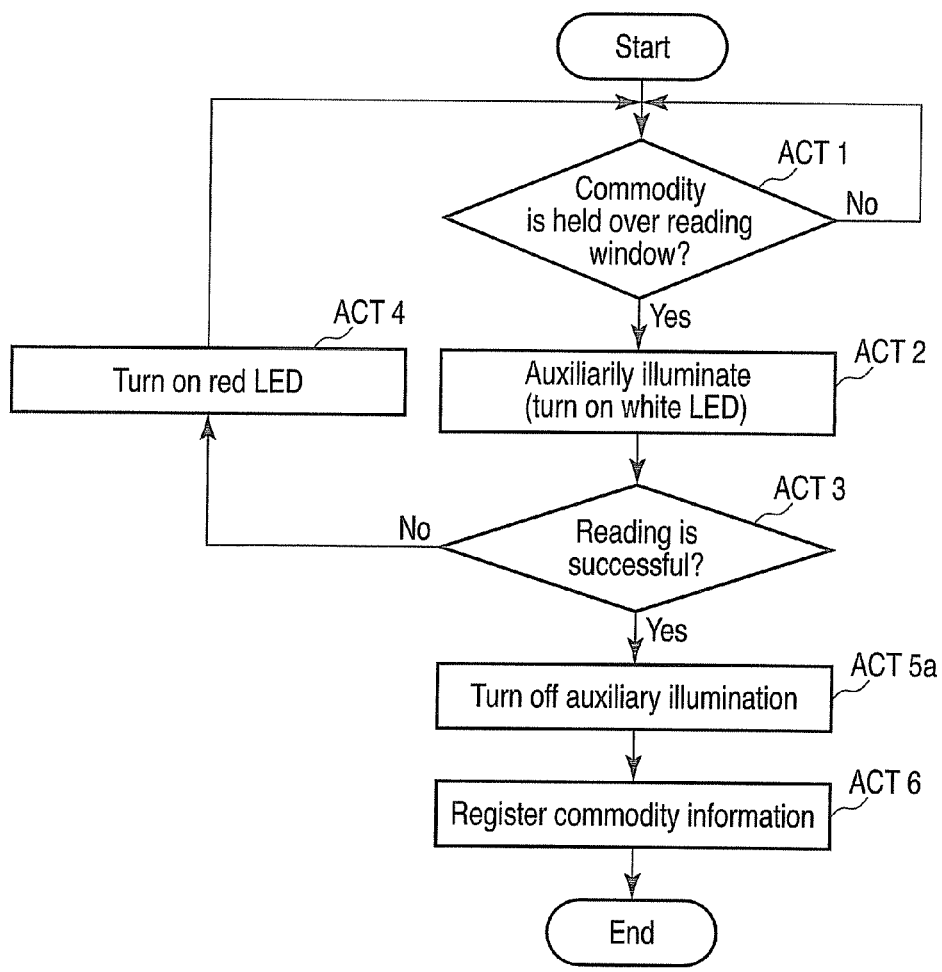
FIG. 5 is a flowchart for explaining processing executed by a CPU of a self-checkout terminal according to a second embodiment.

FIG. 5 is a flowchart for explaining processing executed by the CPU 20 in light emission control for the light emitting unit 9 in this embodiment.

While the scanner 34 receives reading of a barcode in checkout processing, the CPU 20 determines whether a commodity is held over the reading window 10 (ACT 1). If it is determined that a commodity is held over the reading window 10 (Yes in ACT 1), the CPU 20 controls the light emitting unit 9 via the light emitting unit controller 30 to turn on the LED 9a (ACT 2).

After turning on the LED 9a, the CPU 20 determines whether the scanner 34 succeeds in the reading of the barcode (ACT 3). If the decoder 34c cannot decode the barcode, the CPU 20 determines that the scanner 34 fails in the reading of the barcode (No in ACT 3). The CPU 20 controls the light emitting unit 9 via the light emitting unit controller 30 to turn off the LED 9a and instantaneously turn on the LED 9b (ACT 4).

On the other hand, if the decoder 34c can decode the barcode, the CPU 20 determines that the scanner 34 succeeds in the reading of the barcode (Yes in ACT 3). The CPU 20 controls the light emitting unit 9 via the light emitting unit controller 30 to turn off the LED 9a (ACT 5a). Thereafter, the CPU 20 retrieves PLU data associated with a PLU code, which is decoded barcode data, from the PLU file stored in the HDD 25 and registers sales data obtained by associating the number of sold items with the found PLU data in the storage area for sales data registration formed in the RAM 22 (ACT 6). A series of light emission control for the light emitting unit 9 ends.

As explained above, the self-checkout terminal 1 according to this embodiment causes, if a commodity is held over the reading position, the light emitting unit 9 to emit light in white to auxiliarily illuminate the commodity and turns off the illumination if reading of a barcode is successful. With such a configuration, it is also possible to cause a customer to recognize the success of the reading of the barcode by turning off the auxiliary illumination.

The configuration of this embodiment can be realized if the light emitting unit 9 emits light in at least two colors. Therefore, the configuration of the light emitting unit 9 can be simplified.

Besides, it goes without saying that effects same as those in the first embodiment can be realized.

Third Embodiment

A third embodiment is explained below with reference to FIGS. 6 and 7.

This embodiment is different from the first embodiment in that the LED 9a is turned on if auxiliary illumination by the light emitting unit 9 is necessary when the scanner 34 reads a barcode. Besides, components same as those in the first embodiment are denoted by the same reference numerals and signs and redundant explanation of the components is omitted.

Figure 6:
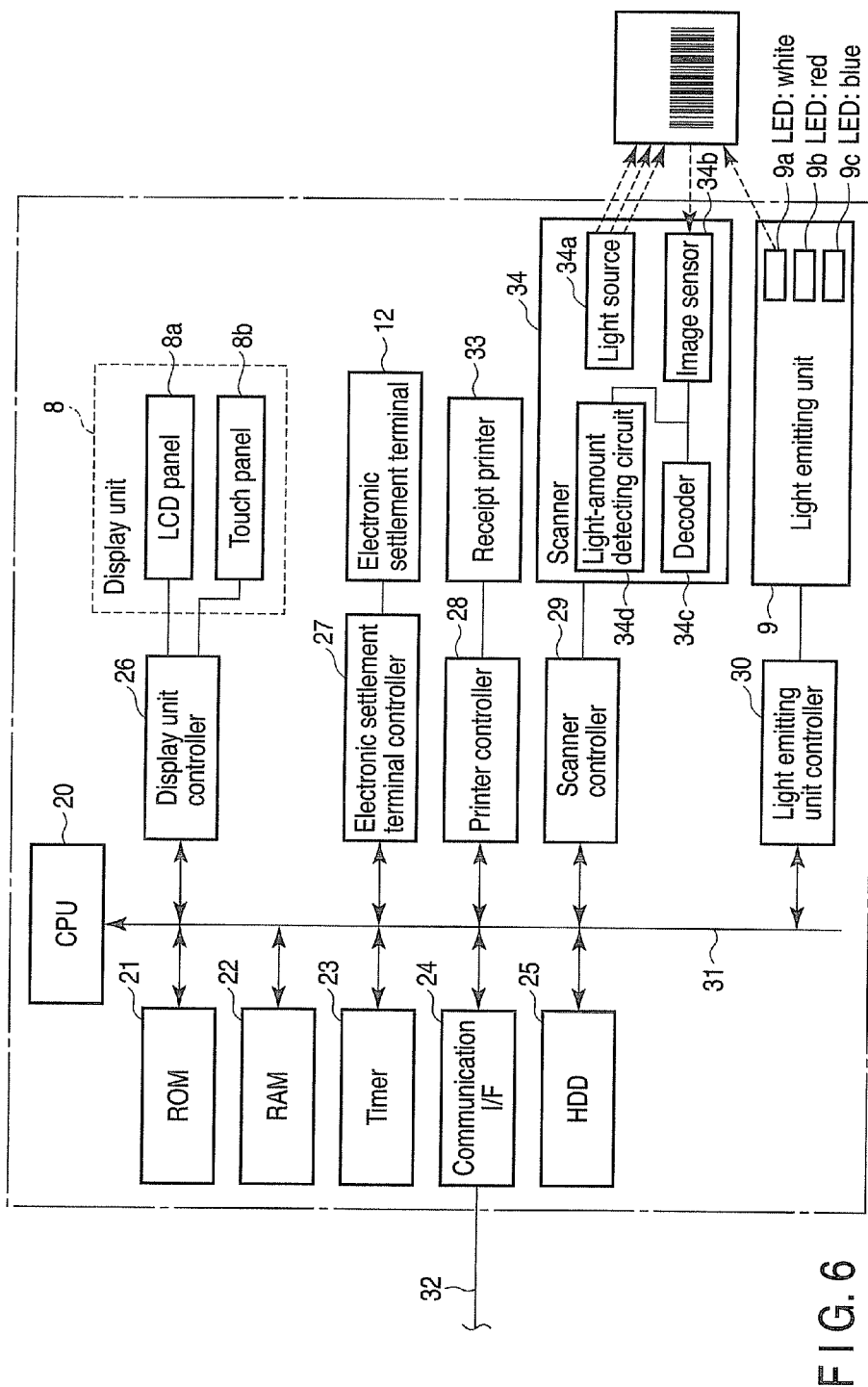
FIG. 6 is a block diagram of a control circuit of a self-checkout terminal according to a third embodiment.

FIG. 6 is a block diagram of a control circuit of the self-checkout terminal 1. The scanner 34 in this embodiment includes a light-amount detecting circuit 34d (a light-amount detecting unit) that detects insufficiency of a light amount of illumination on the reading position. The light-amount detecting circuit 34d is configured to detect insufficiency of a light amount if the amplitude of a video signal output from the image sensor 34b does not reach a threshold set in advance.

FIG. 7 is a flowchart for explaining processing executed by the CPU 20 in light emission control for the light emitting unit 9 in this embodiment.

While the scanner 34 receives reading of a barcode in checkout processing, the CPU 20 determines whether a commodity is held over the reading window 10 (ACT 1). If it is determined that a commodity is held over the reading window 10 (Yes in ACT 1), the CPU 20 determines whether auxiliary illumination by the light emitting unit 9 is necessary (ACT 2a).

If insufficiency of a light amount of illumination on the reading position is detected by the light-amount detecting circuit 34d, the CPU 20 determines that illumination by the light emitting unit 9 is necessary (Yes in ACT 2a). In this case, the CPU 20 controls the light emitting unit 9 via the light emitting unit controller 30 to turn on the LED 9a (ACT 2).

After turning on the LED 9a or if insufficiency of a light amount is not detected by the light-amount detecting circuit 34d (No in ACT 2a), the CPU 20 determines whether the scanner 34 succeeds in the reading of the barcode (ACT 3). If the decoder 34c cannot decode the barcode, the CPU 20 determines that the scanner 34 fails in the reading of the barcode (No in ACT 3). The CPU 20 controls the light emitting unit 9 via the light emitting unit controller 30 to turn off the LED 9a and instantaneously turn on the LED 9b (ACT 4).

On the other hand, if the decoder 34c can decode the barcode, the CPU 20 determines that the scanner 34 succeeds in the reading of the barcode (Yes in ACT 3). The CPU 20 controls the light emitting unit 9 via the light emitting unit controller 30 to turn off the LED 9a and turn on the LED 9c (ACT 5). Thereafter, the CPU 20 retrieves PLU data associated with a PLU code, which is decoded barcode data, from the PLU file stored in the HDD 25 and registers sales data obtained by associating the number of sold items with the found PLU data in the storage area for sales data registration formed in the RAM 22 (ACT 6). A series of light emission control for the light emitting unit 9 ends.

As explained above, in the self-checkout terminal 1 according to this embodiment, if a commodity is held over the reading position and a light amount necessary for the scanner 34 to read a barcode attached to the commodity is insufficient, the light emitting unit 9 emits light in white and illuminates the commodity. In this way, if the self-checkout terminal 1 is configured to cause the LED 9a of the light emitting unit 9 to emit light only when necessary, it is possible to prevent the reading position from being excessively illuminated while realizing a function of the light emitting unit 9 as the auxiliary illumination.

Besides, it goes without saying that effects same as those in the embodiments explained above are realized.

Modification

In the explanation of the embodiments, the light emitting unit 9 is provided between the display unit 8 and the reading window 10. However, the position where the light emitting unit 9 is provided may be modified and implemented within a range in which visibility of the light emitting unit 9 is not lost. For example, the light emitting unit 9 can also be provided below or on the left and right of the reading window 10. However, depending on a setting position of the light emitting unit 9, it is likely that the light emitting unit 9 is blocked by a hand of a customer who performs a scanning action for a barcode or by a commodity. Therefore, it is desirable to provide the light emitting unit 9 in a position where visibility can be sufficiently secured taking into account, for example, the shape of a housing of the self-checkout terminal to which the configurations of the embodiments are applied.

In the explanation of the embodiments, the scanner 34 reads a barcode held over the reading window 10 and inputs a PLU code of a purchased commodity. However, the scanner 34 may read another kind of symbol such as a two-dimensional code attached to a commodity and read information for specifying the commodity. Further, a camera may be provided instead of the scanner 34 to discriminate a type of a commodity held over the reading window 10 according to a hue or shape of the commodity itself.

In the embodiments, the self-checkout terminal including the barcode scanner of the camera imaging type is explained as an example. However, the configurations disclosed in the embodiments may be applied to a self-checkout terminal including a barcode scanner of a laser type that scans a laser beam in a reading position.

In the third embodiment, the LED 9a is turned off and the LED 9c is turned on when reading of a barcode is successful. However, the configuration of the second embodiment may be applied to the third embodiment to cause, without using the LED 9c, a customer to recognize success of reading of a barcode by turning off the LED 9a.

In the embodiments, the self-checkout terminal is explained as an example. However, configurations same as those of the embodiments may be applied to a commodity information reading apparatus such as a scanner used while being connected to a self-checkout terminal, a POS terminal, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A self-checkout terminal comprising:
   a reading unit having a light source for illuminating a reading position and configured to read commodity information from a commodity held over the reading position and illuminated by the light source; and
   a light-amount detecting circuit configured to detect insufficiency of a light amount of illumination on the reading position, and when insufficiency of the light amount is detected by the light-amount detecting circuit, a light emitting unit is configured to emit the light in response to the holding of the commodity over the reading position to auxiliarily illuminate the reading position and turn off the light in response to the reading of the commodity information by the reading unit.

2. The terminal according to claim 1, wherein a range that the light emitting unit illuminates is set smaller than a range in which the reading unit can read the commodity information from the commodity held over the reading position.

3. A control method for a self-checkout terminal including: a reading unit having a light source for illuminating a reading position and configured to read commodity information from a commodity held over the reading position and illuminated by the light source; and a light emitting unit configured to auxiliarily illuminate the reading position, the method comprising:
   detecting the commodity held over the reading position;
   detecting insufficiency of a light amount of illumination on the reading position;
   causing the light emitting unit to emit light to auxiliarily illuminate the reading position when the commodity held over the reading position is detected and based on detection of the insufficiency of the light amount of illumination on the reading position; and
   turning off the light emitting unit in response to the reading of the commodity information by the reading unit.

\* \* \* \* \*